United States Patent [19]
Kurihara et al.

[11] Patent Number: 5,946,036
[45] Date of Patent: Aug. 31, 1999

[54] IMAGE DECODING USING READ/WRITE MEMORY CONTROL BASED ON DISPLAY REGION SETTING

[75] Inventors: Kouichi Kurihara; Shuji Abe; Shinji Yoda, all of Kanagawa-ken, Japan

[73] Assignee: Kabushiki Kaisha Toshiba, Kawasaki, Japan

[21] Appl. No.: 08/780,282

[22] Filed: Jan. 8, 1997

[30] Foreign Application Priority Data

Feb. 1, 1996 [JP] Japan ..................................... 8-016666

[51] Int. Cl.[6] .............................. H04N 7/12; H04N 9/64
[52] U.S. Cl. ........................................... 348/384; 348/714
[58] Field of Search ...................... 348/714, 715, 348/716, 718, 719, 384; 382/232, 233; 364/715.02

[56] References Cited

U.S. PATENT DOCUMENTS 5,646,695  7/1997  Fujiwara ................................. 348/718

FOREIGN PATENT DOCUMENTS

| | | |
|---|---|---|
| 566 092 A2 | 10/1993 | European Pat. Off. . |
| 588 669 A2 | 3/1994 | European Pat. Off. . |
| 600 466 A2 | 6/1994 | European Pat. Off. . |
| 660 614 A1 | 6/1995 | European Pat. Off. . |
| 7-279370 | 10/1995 | Japan . |
| 8-130740 | 5/1996 | Japan . |
| 8-130741 | 5/1996 | Japan . |
| 8-130742 | 5/1996 | Japan . |
| 8-184881 | 7/1996 | Japan . |
| 8-248110 | 9/1996 | Japan . |
| 8-289302 | 11/1996 | Japan . |
| 9-37267 | 2/1997 | Japan . |
| 9130755 | 5/1997 | Japan . |
| 2 194851 | 3/1998 | United Kingdom . |

*Primary Examiner*—Bryan Tung
*Attorney, Agent, or Firm*—Pillsbury Madison & Sutro

[57] ABSTRACT

A coding data is performed in decoding by a stream decoding circuit, an IDCT circuit and an MC circuit. An AGU stores decoding data from the MC circuit to a memory. Regarding the decoding data of a B picture, the AGU writes only the decoding data which are necessary for image display, to a B picture region. Thus, a room occurs in a memory capacity. It is possible to hold the decoding data of the B picture through 2 field periods of time. It is possible to read twice the same decoding data, for display processing. Thus, frame interpolation processing is made possible, and it is possible to obtain a magnified image having high image quality.

7 Claims, 5 Drawing Sheets

|  |  | FIRST FIELD | SECOND FIELD |
|---|---|---|---|
| FIRST LINE | | ○ | |
| SECOND LINE | (1+3) / 2 | × | ○ |
| THIRD LINE | | ○ | (2+4) / 2 × |
| FOURTH LINE | (3+5) / 2 | × | ○ |
| FIFTH LINE | | ○ | (4+6) / 2 × |
| SIXTH LINE | (5+7) / 2 | × | ○ |
| SEVENTH LINE | | ○ | (6+8) / 2 × |
| EIGHTH LINE | | | ○ |

| | FIRST FIELD | | SECOND FIELD |
|---|---|---|---|
| FIRST LINE | ○ | | |
| SECOND LINE | × | ←—2—— | ○ |
| THIRD LINE | ○ | ——3—→ | × |
| FOURTH LINE | × | ←—4—— | ○ |
| FIFTH LINE | ○ | ——5—→ | × |
| SIXTH LINE | × | ←—6—— | ○ |
| SEVENTH LINE | ○ | ——7—→ | × |
| EIGHTH LINE | | 8 | ○ |

FIG.6

IMAGE DECODING USING READ/WRITE MEMORY CONTROL BASED ON DISPLAY REGION SETTING

BACKGROUND OF THE INVENTION

1. Field of the Invention

The present invention relates to an image decoding device for performing, in decoding, coding data which include bidirectional predictive coding data.

2. Related Art Statement

In recent years, in keeping with establishment of a high-efficiency coding technique of an image, digital processing of the image has been diffused. The high-efficiency coding technique is such that image data are performed in coding by a less bit rate, in order to improve efficiency of digital transmission, recording and the like. In this high-efficiency coding, orthogonal transformation such as DCT (discrete cosine transformation) processing or the like is performed by a block unit of m×n pixels. The orthogonal transformation is one which transforms an inputted sample value to an orthogonal component such as a spacial frequency component or the like. Thus, a spacial correlation component is so made possible as to be deleted. The component which is transformed in orthogonalization is quantized whereby redundancy of the signal of the block is reduced.

Moreover, variable-length coding such as Huffman coding or the like is applied to the quantization output whereby an amount of data can further be reduced. The Huffman coding is one in which coding is performed on the basis of the results which are computed from the amount of statistical codes of the quantization output. A whole amount of data is reduced by the variable-length coding in which short bits are allocated to data which are high in appearance probability, and long bits are allocated to data which are low in appearance probability.

In a device for performing the high-efficiency coding, a hybrid system which is employed in MPEG (Moving Picture experts group) or the like has become the main current. In this system, inter-frame compression in which inter-frame correlation is utilized to curtail or reduce redundancy in a direction of a time axis is also employed, in addition to intra-frame compression in which an intra-frame image is processed in DCT. The inter-frame compression is arranged such that such a property that general animations well resemble each other in before and after or before and behind frames is utilized to find out a difference between the before and behind frames, and a difference value (predict error) is performed in coding, whereby a bit rate is further reduced. Particularly, motion-compensation inter-frame predictive coding is effective in which motion of the image is predicted to find out an inter-frame difference, to thereby reduce the predictive error.

In this manner, in the hybrid system, in addition to the intra-frame coding in which the image data of the predetermined frame are processed in DCT as they are and are coded, the predictive coding is employed in which only the difference data between the image data of the predetermined frame and the reference image data of the frames before and behind this frame are processed in DCT and are performed in coding. A predictive coding method includes forward predictive coding in which the reference image data in a direction which is front or forward in view of time are compensated in motion to find out a predictive error, rearward predictive coding in which the reference image data in a direction which is rearward in view of time are compensated in motion to find out a predictive error, and bidirectional predictive coding which uses the average in either one direction of the forward and the rearward or in both directions, in consideration with the coding efficiency.

Since the frame which is performed in coding by the intra-frame coding (hereinafter referred to as an "I picture) is performed in coding only by the intra-frame information, the frame is capable of being decoded only by independent coding data. Accordingly, the arrangement is such that, in an MPEG standard, one I picture is inserted into a fixed period or a fixed cycle (12 frames, for example) in order for prevention of error propagation, or the like. In the MPEG standard, the inter-frame coding frame (hereinafter referred to as a "P picture") is obtained by the forward predictive coding which uses this I picture. In this connection, the P picture is also obtained by the fact that the forward P picture is performed in coding in forward prediction. Moreover, the bidirectional predictive adaptation change-over frame (hereinafter referred to as a "B picture) is obtained by the bidirectional predictive coding which uses the I and P pictures in either one direction or in both directions of the forward and the rearward.

Figure 1:
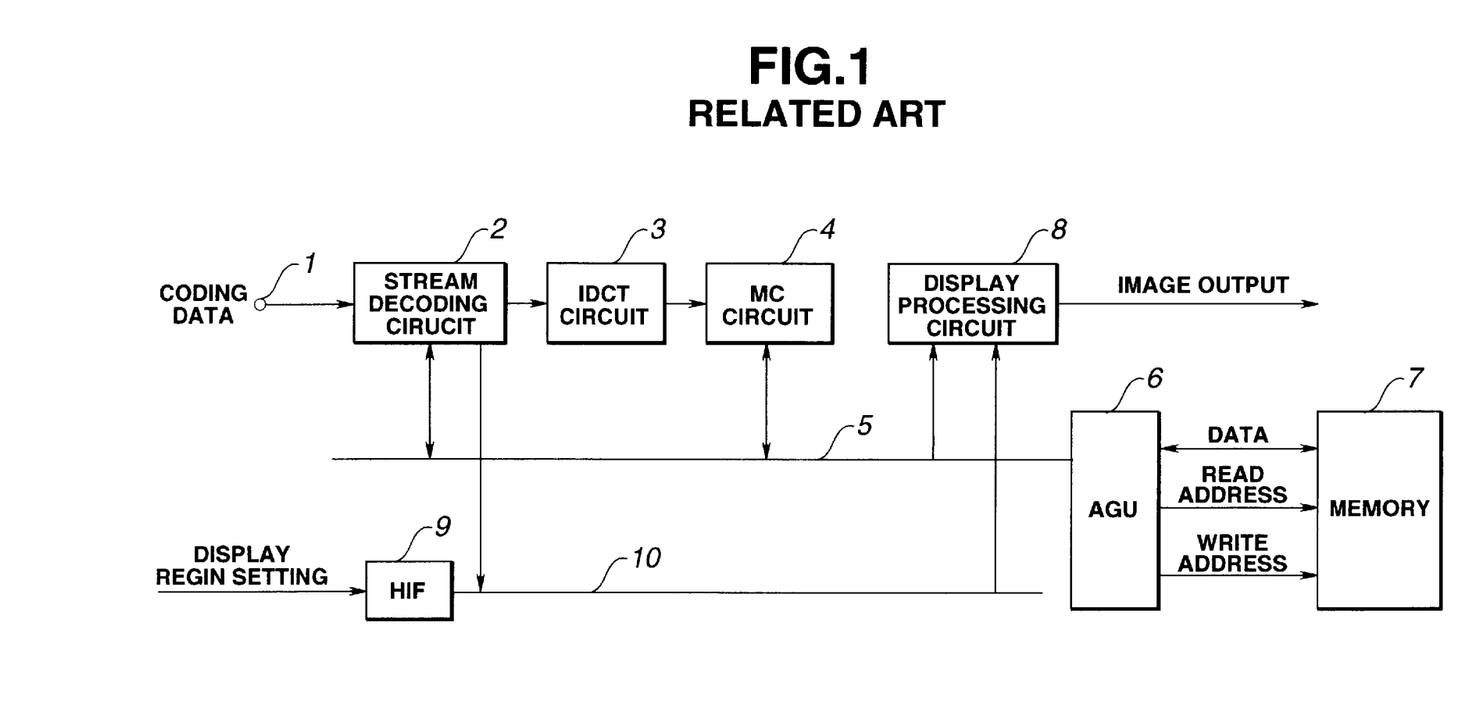
FIG. 1 is a block diagram showing a related art of an image decoding device.

FIG. 1 is a block diagram showing the related art of the image decoding device for performing in decoding the coding data which have such I, P and B pictures.

The coding data which are inputted through an input terminal 1 are supplied to a stream decoding circuit 2. These coding data are ones to which the above-described high efficiency coding is applied, and are obtained by the fact that the image data or the predictive error are/is processed in DCT and are/is quantized, thereafter, are/is performed in coding in variable length. The stream decoding circuit 2 performs in decoding in variable length the inputted coding data and, thereafter, the inputted coding data are quantized in reverse so as to be outputted to an inverse DCT circuit (hereinafter, referred to as an "IDCT circuit") 3. The IDCT circuit 3 processes in inverse DCT the inverse quantization output to return the same to data prior to DCT processing on the side of coding.

The data which are performed in decoding by the IDCT circuit 3 are transmitted to a memory data bus 5 through a motion compensation circuit (hereinafter, referred to as an "MC circuit") 4. An address generator unit (hereinafter, referred to as an "AGU") 6 transmits the decoding data which are transmitted through the memory data bus 5, to a memory 7 to store the same in the memory 7.

Now, it is assumed that the coding data of an I picture are inputted. In this case, an output from the IDCT circuit 3 is a restored image of the frame. The output from the IDCT circuit 3 is given to the memory 7, as it is, through the MC circuit 4 and is stored. The output from the IDCT circuit 3 is pixel data in a block unit. The memory 7 holds the pixel data for a 1 frame.

Next, it is assumed that a P picture is performed in decoding. In this case, the output from the IDCT circuit 3 is a predictive error. The MC circuit 4 reads the restored image data of the I picture that is a reference image from the memory 7, to compensate, in motion, the same by the use of the motion vector. The MC circuit 4 obtains the decoding data of the P picture by addition between the restored image data of the I picture which are compensated in motion, and the predictive error. The decoding data of the P picture from the MC circuit 4 are transmitted through the memory data bus 5, and are written to the memory 7 by the AGU 6.

Next, it is assumed that a B picture is performed in decoding. Also in this case, the output from the IDCT circuit 3 is a predictive error. The MC circuit 4 reads the restored image data of the reference image which is stored in the memory 7, and uses the motion vector to compensate, in motion, the same to thereby add the same to the predictive error. Thus, the MC circuit 4 obtains the restored image data of the B picture. These image data are given to the memory 7. Thereafter, similarly, decoding is performed. The AGU 6 reads the data which are stored in the memory 7, in display order, and outputs the same through a display processing circuit 8.

By the way, the memory 7 has a region which stores the reference image (hereinafter, referred to as a "reference-image memory region"), and has a memory region for transforming the restored image in interlace order (hereinafter, referred to as a "display transformation memory region"). Specifically, when the decoding data are of a progressive (frame) arrangement, in order to perform interlace display, it is necessary to perform transformation from progression to interlace (hereinafter, referred to as an "interlace transformation").

The P picture is performed in decoding by the use of the reference image of the forward frame. Since the P picture holds the reference image for the decoding, the reference-image memory region for the 1 frame is necessary. Further, the B picture is performed in decoding by the use of the reference images of the forward and rearward frame, and the reference-image memory region for the 2 frames is necessary for holding these reference images. Moreover, since the coding processing is performed in the DCT block unit, the display transformation memory region for the 1 frame is necessary for framing the coding data from the MC circuit 4 and, thereafter, for outputting the same in the interlace order. In this case, the decoding data of the I and P pictures are stored in the reference-image memory region of the memory 7 in order to be used as the reference image of the B picture. Read from this region is controlled and is outputted, whereby this region can be used both as the display transformation memory region for interlace transformation. However, since the decoding data of the B picture are not used as ones for the reference image and are not stored in the reference-image memory region, the display transformation memory region for the interlace transformation is necessary. Specifically, since only the decoding data of the B picture should be stored in the display transformation memory region, this region will hereinafter be referred also to as a "B picture region".

Figure 2:
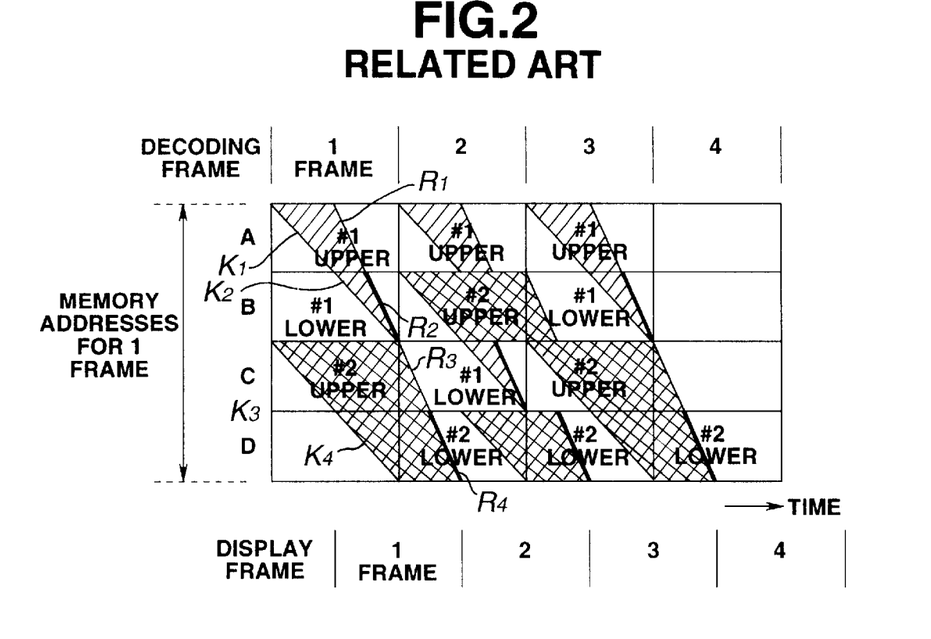
FIG. 2 is an explanatory view for describing operation of the device in FIG. 1.

Next, write and read from and to the display transformation memory region when the interlace transformation is performed will be described with reference to FIG. 2. In FIG. 2, a horizontal axis indicates time of the frame unit, while a vertical axis indicates an address space in the display transformation memory region. Furthermore, oblique line parts and oblique lines in a left side of screening parts indicate write of the decoding data. Oblique line parts and oblique lines on a right side of the screening parts indicate read of the coding data, while the oblique line parts and the screening parts indicate that the decoding data are held. Further, the oblique line parts and the thick line on the right side of the screening parts indicate read at the time of enlarged or magnified display. In this connection, the capacity of the display transformation memory region is assumed to be for a 1 frame, and the capacity of each of the regions A to D is either ¼ the full capacity.

The display transformation memory region of the memory 7 has four regions including A to D. In order to use the memory for a 1 frame to interlace the image data of a 1 frame to thereby output the same, it is necessary to perform the write and the read simultaneously. In view of this, the arrangement is such that the image data of the 1 frame are divided into four, and four regions A to D are provided, to control the write and the read every regions.

Specifically, it is assumed that the image data of the first field are divided vertically of the image plane so as to be made to data #1 upper and data #1 lower, respectively. Furthermore, the image data of the second field are also divided vertically of the image plane so as to be made to data #2 upper and data #2 lower, respectively. The data #1 upper and the data #2 lower are stored respectively in the regions A and D, and the data #1 lower and the data #2 upper are alternately stored respectively in the regions C and D.

When the coding data which are performed in coding by the frame arrangement are performed in decoding, the decoding output from the MC circuit 4 is successively outputted in the block unit from the first block line corresponding to the upper end of the image plane, to the block line corresponding to the lower end of the image plane. Specifically, in the image decoding device in FIG. 1, the data #1 upper and the data #2 upper are performed in decoding in the 1 field period the first half the decoding frame, and the data #1 lower and the data #2 lower are performed in decoding in the next 1 field period.

In the first 1 field period of time, the data #1 upper and the data #2 upper which are performed in decoding are respectively written successively to the regions A and C. Oblique lines K1 and K3 in FIG. 2 indicate write to the regions A and C. The amount of data of the data #1 upper and the data #2 upper is ¼ the 1 frame, and is written to all the area of the regions A and C in the 1 field period of time.

In the next 1 field period of time, the data #1 lower and the data #2 lower which are performed in decoding are respectively written successively to the memories B and D. Oblique lines K2 and K4 in FIG. 2 indicate write to the regions B and D. The amount of data of the data #1 lower and the data #2 lower is ¼ the 1 frame, and is written to all the area of the regions B and D in the 1 field period of time.

Further, in this field period of time, read is performed from the region A. The oblique line R1 in FIG. 2 indicates the read from the region A. The data are read from the region A in write order so that all the data #1 upper which are stored in the region A are read in the half field period of time. Moreover, by the oblique line R2 in FIG. 2, it is indicated that the data #1 lower which are stored in the region B are also read, in the latter half of this field period of time. The data #1 upper and the data #1 lower which are read in this field period of time are outputted as data of the first field of the display frame.

In the first half of the next field period of time, the data #2 upper which are written to the region C in the period of the oblique line K3 are read (oblique line R3). In the latter half, the data #2 lower which are written to the region D in the period of the oblique line K4 are read (oblique line R4). Thus, the data #2 upper and the data #2 lower are outputted as data of the second field.

Subsequently, similar operation is repeated, and the regions A to D are suitably assigned such that the write regions are not overlapped with each other, whereby it is possible to obtain the interlace output successively.

By the way, the read from the memory 7 is controlled, and predetermined filtering processing is applied to the decoding data, whereby it is also possible to magnify or enlarge and display a part of the image, for example, in a vertical direction.

Figure 3:
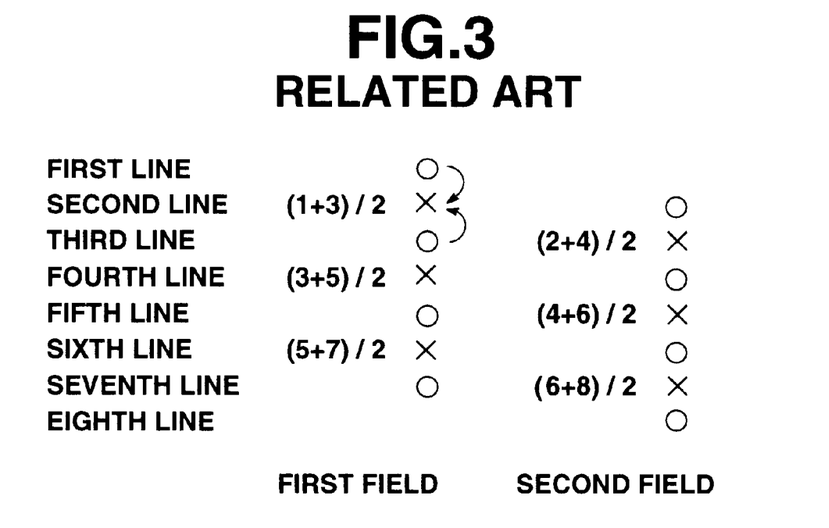
FIG. 3 is an explanatory view for describing interpolation processing.

FIG. 3 is an explanatory view for describing interpolation processing of the display processing circuit 8 when a system for performing the interpolation processing in division into an image of a first field and an image of a second field is employed (hereinafter referred to as a "field interpolation system"). An example in FIG. 3 shows the interpolation processing for display a lower half of the image in magnification or enlargement twice in the vertical direction.

FIG. 3 shows the read of the memory 7 in the first field and the second field. Marks ○ show decoding data which are read from the memory 7, while marks x show interpolated data.

In the first field, the display processing circuit 8 uses the restored pixel data of the odd line (marks ○) which are read from the memory 7, to interpolate the pixel data of the even line (marks x). Since it is magnified twice vertically, a 1 interpolation line should be created between the respective read lines. That is, the display processing circuit 8 increases ½ times the sum of the odd lines upper and lower the interpolated even line, to thereby obtain the interpolation data of the even lines.

Figure 4A:
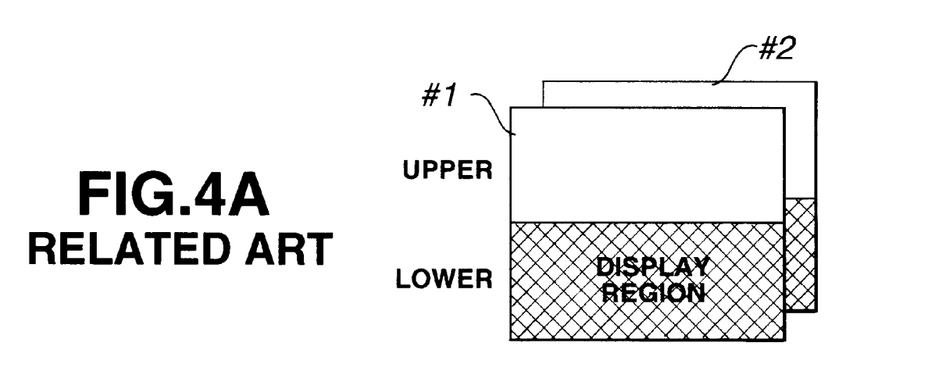
FIG. 4A is an explanatory view for describing magnified or enlarged display.

Similarly, in the second field, the display processing circuit 8 increases ½ times the sum of the pixel data of the adjacent two even lines which are read from the memory 7, to thereby obtain the interpolation data of the odd lines which are shown by the marks x. Thus, the image of the lower half shown in the oblique line parts in FIG. 4A is magnified to an image which is shown in oblique line parts in FIG. 4B.

In this connection, the read of the memory 7 in this case is shown by thick lines on the right side of the oblique line parts and the screening parts in FIG. 2. Further, setting information such as a display region of a magnified image is so arranged as to be supplied from a host interface (hereinafter referred to as an "HIF") 9 to the display processing circuit 8 through a setting data bus 10.

Figure 5:
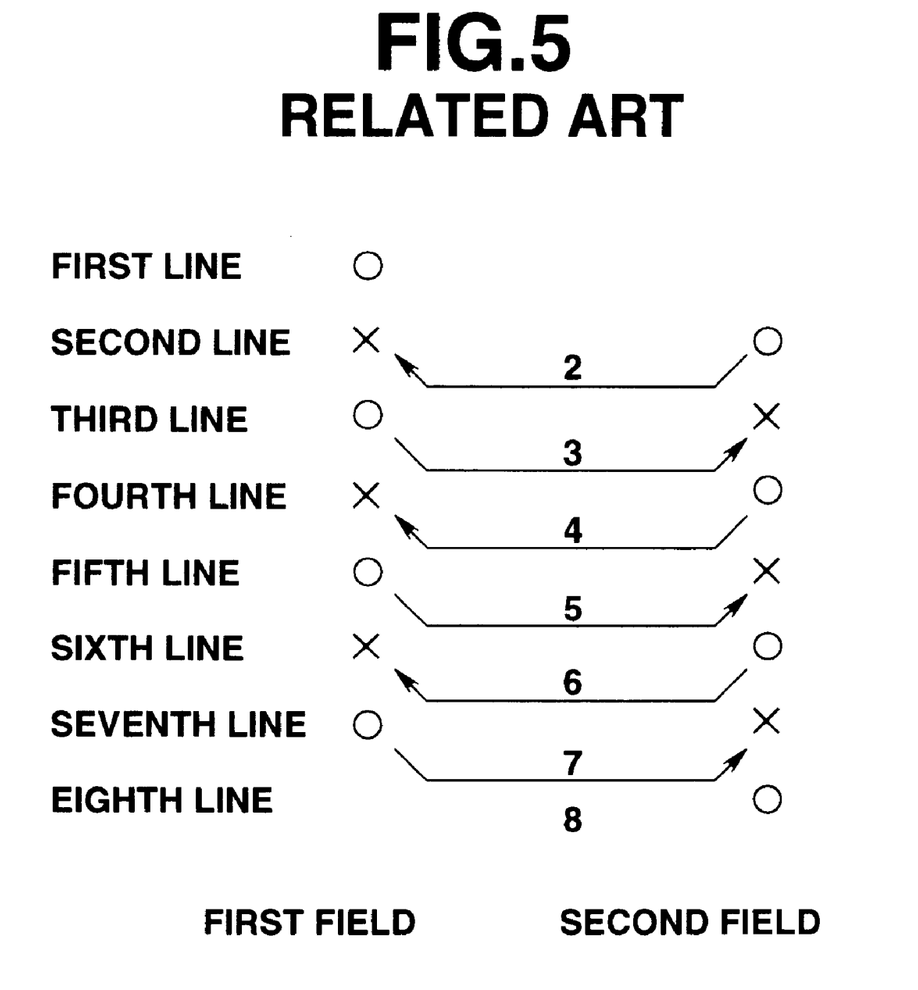
FIG. 5 is an explanatory view for describing interpolation processing.

Moreover, FIG. 5 is an explanatory view for describing the interpolation processing of the display processing circuit 8 when a system for performing the interpolation processing (hereinafter referred to as a "frame interpolation system") is employed with respect to an image which has the frame arrangement. An example in FIG. 5 also shows the interpolation processing for displaying a lower half the image in magnification twice in the vertical direction. Also in FIG. 5, marks ○ show decoding data which are read from the memory 7, while marks x show interpolated data.

In the first field, a portion between the first and third lines is interpolated by the use of the pixel data of the second line of the second field. Further, in the second field, a portion between the second and fourth lines is interpolated by the use of the pixel data of the third line of the first field.

When the coding data of a progressive image like motion pictures are inputted to the input terminal 1 in FIG. 1, the image quality is improved in one which employs the frame interpolation system. As will be clear from the above description, however, in the frame interpolation system, the pixel data of the first field and the second field are necessary also in either of the first field period of time and the second field period of time.

Specifically, if the frame interpolation system is adopted or employed, the data #1 lower which are stored in a B picture region of the memory 7, for example, must continue to be stored in the B picture region until the data #2 lower are used in display. For this period, the region B or C of the B picture region is not opened so that the next data #2 upper cannot be written. Accordingly, when the memory capacity for the 1 frame is set as the B picture region, it is impossible to employ the frame interpolation system because of insufficiency of the memory capacity.

In this manner, there are the following problems. That is, when a part of the image is displayed in magnification, for example, it is impossible to perform the interpolation processing with respect to the image which has the frame arrangement, because of insufficiency of the memory capacity, in spite of the size of the displayed image. Accordingly, it is impossible to improve the image quality.

OBJECTS AND SUMMARY OF THE INVENTION

It is an object of the present invention to provide an image decoding device which enables interpolation processing with respect to an image which has a frame arrangement, without the fact that a memory capacity increases, so that an image quality can be improved.

It is another object of the present invention to provide an image decoding device which enables special display which uses decoding data which correspond to a part of an image, without the fact that a memory capacity increases.

Further, it is another object of the present invention to provide an image decoding device which enables magnified or enlarged display which uses decoding data which correspond to a part of an image, without the fact that a memory capacity increases.

Moreover, it is the other object of the present invention to provide an image decoding device which enables 3:2 pull-down transformation, without the fact that a memory capacity increases.

An image decoding device according to the present invention comprises decoding means for performing in decoding inputted coding data in a predetermined block unit to output decoding data, memory means capable of storing said decoding data, write control means to which display information is given for special display in which a part of a restored image which is formed by said decoding data for use in display, for storing only said decoding data corresponding to the part of said restored image, to said memory means, on the basis of said display information, and read control means for reading said decoding data corresponding to the part of said restored image which is written to said memory means, through the number of times in accordance with said special display and for opening a region which has been completed in read of the number of times in accordance with said special display, for write.

The other advantages and benefits of the present invention will become sufficiently apparent from the following explanation.

DETAILED DESCRIPTION OF THE PREFERRED EMBODIMENTS

Figure 6:
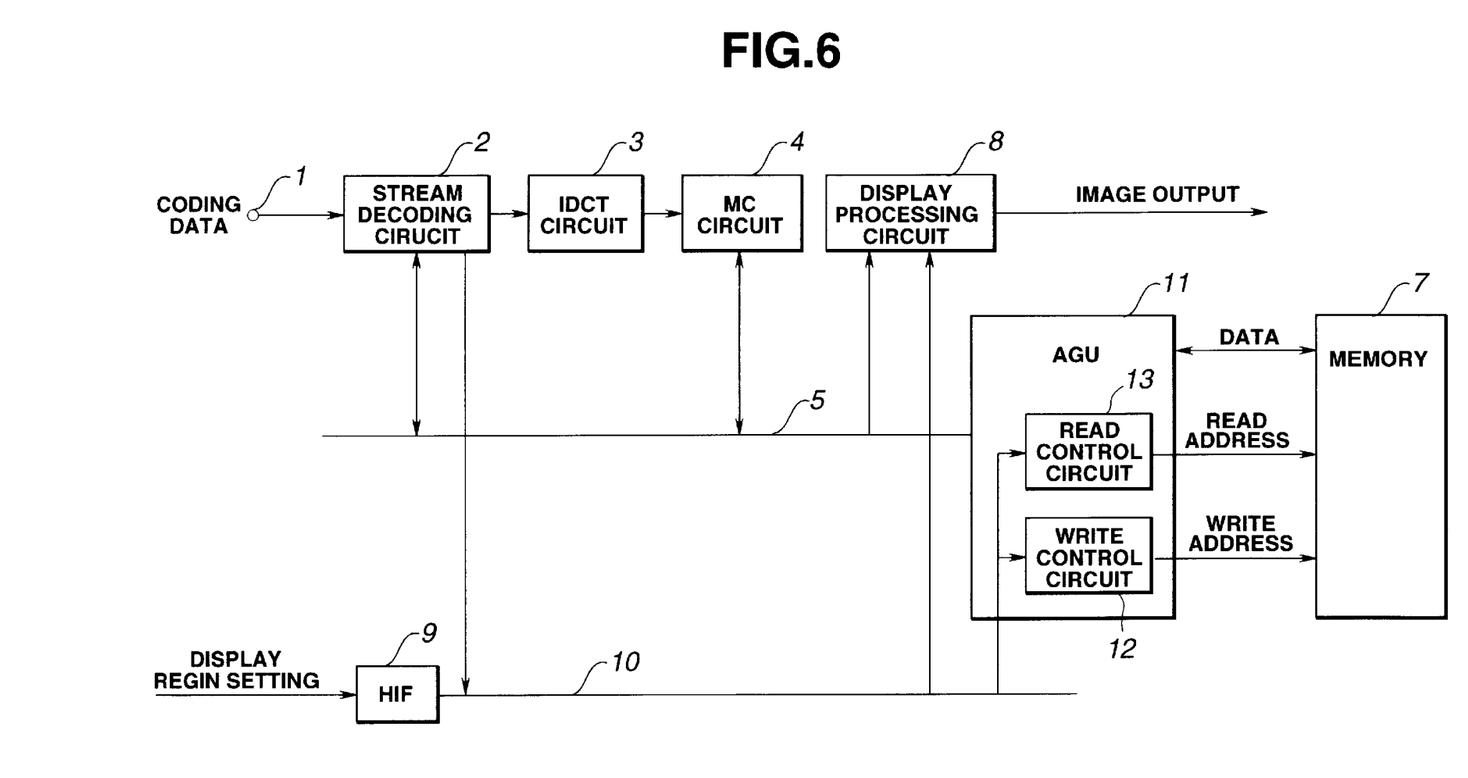
FIG. 6 is a block diagram showing an embodiment of an image decoding device according to the present invention.

FIG. 6 is a block diagram showing an embodiment of an image decoding device according to the present invention. In FIG. 6, the same reference numerals are applied to the same constitutional elements as those in FIG. 1.

A coding data are inputted to the input terminal 1. These coding data are ones which are created by DCT processing, quantization processing and variable-length coding processing, and have the I picture due to processing within a frame or intra-frame processing, the P picture which uses a reference image in a forward or a rearward frame, and the B picture which uses a reference image in a bidirectional frame. Further, the coding data also include information of a motion vector which is used at creation of the P and B pictures. In this connection, a frame mode is employed in the DCT processing, and the DCT processing is performed in a block unit.

The coding data are supplied to the stream decoding circuit 2. The stream decoding circuit 2 returns the inputted coding data to data prior to the variable-length coding processing on the side of coding, by the variable-length decoding processing and, further, returns the same to data prior to quantization by the inverse quantization processing. The inverse quantization output from the stream decoding circuit 2 is supplied to the IDCT circuit 3.

In connection with the above, in addition to the image data, the coding data include a flag which indicates a form as to whether information which indicates the image display region and the image data which are performed in coding is the progressive image or is the interlace image. The information is adapted to be decoded by the stream decoding circuit 2.

The IDCT circuit 3 processes in inverse-DCT the inverse quantization output to output the same to the MC circuit 4. When the output of the IDCT circuit 3 is one in which the I picture is performed in decoding, the MC circuit 4 transmits the output of the IDCT circuit 3 to the memory data bus 5 as it is.

An AGU 11 has a write control circuit 12 and a read control circuit 13. The write control circuit 12 and the read control circuit 13 supply respectively the write address and the read address to the memory 7 to control write and read with respect to the memory 7. When the decoding data which are transmitted through the memory data bus 5 are ones in which the I picture is performed in decoding, the AGU 11 is adapted to write these decoding data to the reference-image memory region of the memory 7.

On one hand, when the output from the IDCT circuit 3 is not one in which the P and B pictures are performed in decoding, the MC circuit 4 controls the AGU 11 to read the reference image data which are stored in the reference-image memory region. The reference image data are given to the MC circuit 4 from the AGU 11 through the memory data bus 5. The MC circuit 4 is adapted to compensate in motion these reference image data and, thereafter, to add the same and the output of the IDCT circuit 3 to each other to obtain the restored image data. The MC circuit 4 transmits these restored image data to the memory bus 5.

When the decoding data which are transmitted through the memory data bus 5 are ones in which the P picture is performed in decoding, the AGU 11 is adapted to write the decoding data of this P picture to the reference-image memory region of the memory 7, and when the decoding data are ones in which the B picture is performed in decoding, the AGU 11 is adapted to write the decoding data of this B picture to the B picture region of the memory 7.

On one hand, a magnification ratio of the display image and the display-region setting information including the information of the display region or the like are inputted to the HIF 9. The HIF 9 outputs the display-region setting information to the read control circuit 13 and the write control circuit 12 of the AGU 11 through the setting data bus 10. Moreover, a flag which indicates the information of the display region and a form of the image is inputted from the stream decoding circuit 2 into the AGU 11 through the memory data bus 5.

In the present embodiment, the write control circuit 12 and the read control circuit 13 of the AGU 11 are adapted to control write and read of the B picture with respect to the memory 7, on the basis of the image display region, the flag indicating the form of the image and the display-region setting information. Specifically, when a mode is assigned in which a predetermined portion of the image is displayed in magnification, the AGU 11 is adapted to judge a decoding data portion necessary for the magnified display, and, regarding the B picture, to write only the image portion which is used in the display, to the B picture region of the memory 7.

In connection with the above, when the coding data are ones in which the interlace image is performed in coding, if the frame interpolation system is employed, the image quality is degraded. For this reason, when the decoding data of the interlace image are inputted, the field interpolation system is adopted or employed. Specifically, when the coding data are ones in which the interlace image is performed in coding, the AGU 11 is adapted to perform the write and the read similar to those of the related art shown in FIG. 1.

The decoding data which are read from the memory 7 by the AGU 11 are inputted to the display processing circuit 8 through the memory data bus 5, and the display processing circuit 8 applies predetermined filtering processing to these decoding data to output the same. For example, the image display region, the flag indicating the form of the image and the display-region setting information are given to the display processing circuit 8 through the busses 5 and 10. On the basis of the information, the display processing circuit 8 is adapted to perform the interpolation processing to output the same.

Figure 7:
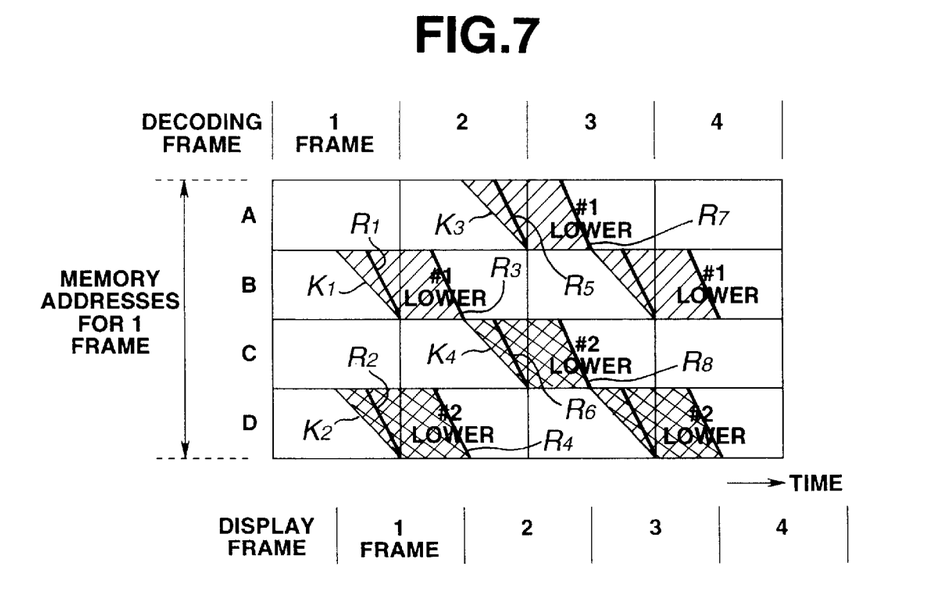
FIG. 7 is an explanatory view for describing the embodiment.

Next, operation of the embodiment which is arranged in this manner will be described with reference to FIG. 7. FIG. 7 shows the write and the read with respect to the memory 7. In FIG. 7, the horizontal axis indicates time of the frame unit, while the vertical axis indicates an address space of the display transformation memory region. Further, lines on the left side of the oblique line parts and the screening parts indicate write of the decoding data, while lines on the right side of the oblique line parts and the screening parts indicate read of the coding data. The oblique line parts and the screening parts indicate that the decoding data are held in the memory 7. Moreover, thick lines on the right side of the oblique line parts and the screening parts indicate read at the time of magnified display. In this connection, the capacity of the B picture region is for a 1 frame, and the capacity of each of the regions A to D is either ¼ the full capacity.

The decoding processing is similar to that of the related art illustrated in FIG. 1. Specifically, the coding data which are inputted through the input terminal 1 are inputted to the stream decoding circuit 2. The coding data have the I, P and B pictures.

The coding data are performed in variable-length coding by the stream decoding circuit 2 and, further, are processed in inverse quantization and are returned to the data prior to the quantization. The inverse quantization output of the stream decoding circuit 2 is given to the IDCT circuit 3, is processed in inverse DCT, is returned to the data prior to the DCT processing on the coding side, and is supplied to the MC circuit 4. In this connection, these processings are performed in the block unit.

When the inputted coding data are ones in which the I picture is performed in coding, the MC circuit 4 transmits the inputted data to the memory data bus 5 as they are. The write control circuit 12 of the AGU 11 successively writes the decoding data in the block unit, which is transmitted to the memory data bus 5, to the reference-image memory region of the memory 7 to frame the same, for example. By the AGU 11, the decoding data which are stored for the 1 frame are read in display order by the read control circuit 13 at predetermined output timing, and are outputted to the display processing circuit 8.

When the inputted coding data are ones in which the P picture is performed in coding, the output of the IDCT circuit 3 is the predictive error, and the motion vector is also outputted from the stream decoding circuit 2. The memory 7 holds the decoding data of the I picture in the reference-image memory region as the reference image. The MC circuit 4 controls the AGU 11 to read the reference image data of the I picture from the memory 7, to compensate in motion the same by the use of the motion vector. Furthermore, the MC circuit 4 adds the data of the reference image which are compensated in motion, and the output of the IDCT circuit 3 to each other, to obtain the restored image of the P picture. The decoding image data from the MC circuit 4 are transmitted through the memory data bus 5, and are written to the reference-image memory region of the memory 7 by the AGU 11.

Next, it is assumed that the coding data on the basis of the B picture are inputted. Also in this case, the output from the IDCT circuit 3 is a predictive error. The MC circuit 4 controls the AGU 11 to read the reference image which is stored in the reference-image memory region of the memory 7, to thereby compensate in motion the same. The MC circuit 4 restores the original data by addition between the reference image data which are compensated in motion and the output from the IDCT circuit 3.

When normal or usual display is performed in the display processing circuit 8, the decoding data of the B picture from the MC circuit 4 are written to the B picture region by the AGU 11, similarly to the related art in FIG. 1, and are framed.

Furthermore, also when, in the display processing circuit 8, the filtering processing for magnifying and displaying a part of the image is performed, the decoding data of the I and P pictures are stored in the reference-image memory region by the AGU 11, similarly to the related art in FIG. 1, and are framed.

In the present embodiment, when, in the display processing circuit 8, the filtering processing for magnifying and displaying the part of the image is performed, the write and read processings with respect to the memory 7 when the decoding data of the B picture are outputted from the MC circuit 4 are different from those in the related art in FIG. 1.

Now, it is assumed that a part of the restored image is magnified in the vertical direction and is displayed. The inputted coding data include the flag which indicates whether the coding data are ones in which the progressive image is performed in coding, or ones in which the interlace image is performed in coding. The AGU 11 takes in or fetches this flag from the stream decoding circuit 2 through the memory data bus 5. When the coding data are ones in which the interlace image is performed in coding, the display processing circuit 8 adopts or employs the field interpolation system to perform the interpolation. The AGU 11 performs the write and the read with respect to the memory 7 similarly to the related art in FIG. 1 also regarding the B picture.

Here, it is assumed that the coding data are indicated as being the progressive image by the flag. The information of the image display region is also contained in the coding data. The AGU 11 takes in or fetches this information from the stream decoding circuit 2 through the memory data bus 5. On one hand, the magnification ratio of the display image and the display-region setting information of the display position or the like are inputted through the HIF 9. The AGU 11 takes in the display-region setting information through the setting data bus 10.

Figure 4B:
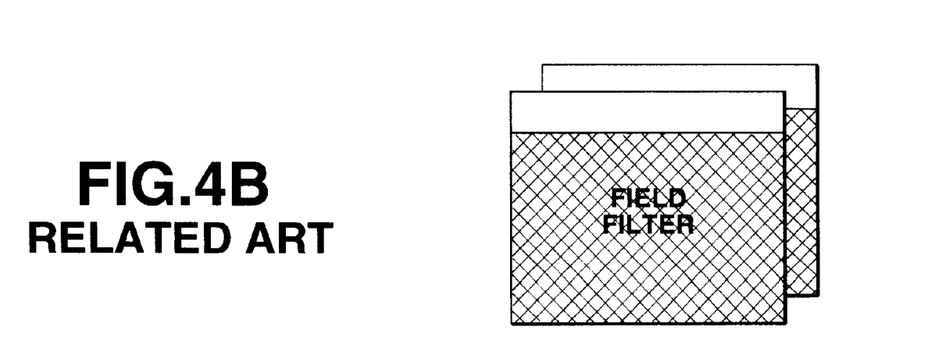
FIG. 4B is an explanatory view for describing magnified display.

The AGU 11 judges that, of the decoding data of the B picture, the data in any what portion are necessary for the display of the magnified image, on the basis of the taken-in various kinds of information. Now, by the taken-in various kinds of information, it is assumed, it is assigned that a portion lower half the image is magnified twice in the vertical direction and is displayed on the whole area of the image plane, as shown in FIG. 4A and FIG. 4B. In this case, the AGU 11 judges that, of the decoding data of the B picture, only the decoding data the lower half the image are necessary for the display.

In the predetermined decoding frame, it is assumed that the output of the decoding data of the B picture starts from the MC circuit 4. For example, in the first decoding frame in FIG. 7, the decoding data from the MC circuit 4 are successively outputted from a block line at the uppermost part of the image plane toward a block line at the lowermost part. The write control circuit 12 of the AGU 11 does not write, to the memory 7, data upper half the B picture which are outputted during a 1 field period of time the first half the first decoding frame, that is, the data #1 upper and the data #2 upper.

During a 1 field period of time the latter half the first decoding frame, the data lower half the image plane, that is, the data #1 lower and the data #2 lower are outputted from the MC circuit 4. The write control circuit 12 of the AGU 11 successively generates write addresses corresponding to the regions B and D of the B picture region of the memory 7, in the latter half of the first decoding frame in FIG. 7. Thus, as shown in the oblique lines K1 and K2 in FIG. 7, write is performed to the regions B and D of the data #1 lower and the data #2 lower, in the latter half of the first decoding frame, as shown by the oblique lines K1 and K2 in FIG. 7.

On one hand, the read control circuit 13 generates the read addresses which assign the regions B and D, in order to form the display frame, in the latter half the first half of the first display frame (latter half the first decoding frame). Thus, as shown by the oblique lines R1 and R2 in FIG. 7, read of the data #1 lower and the data #2 lower which are stored in the regions B and D starts.

These data are supplied to the display processing circuit 8 from the AGU 11 through the memory data bus 5. Various kinds of information which are necessary for the magnified display are also supplied to the display processing circuit 8 through the bus 5. For example, the frame interpolation system shown in FIG. 5 is employed to use the data #1 lower and the data #2 lower the lower half the image plane to thereby perform the interpolation processing.

In the first half the second decoding frame, the data #1 upper and the data #2 upper are outputted from the MC circuit 4 in the block unit. In this case, the AGU 11 does not perform write with respect to the memory 7 of the data #1 upper and the data #2 upper. On one hand, this period of time corresponds to the latter half the first display frame. The read control circuit 13 of the AGU 11 generates the read addresses of the regions B and D, in the latter half the latter half the first display frame. Thus, as shown in the oblique lines R3 and R4 in FIG. 7, the data of the data #1 lower and the data #2 lower are again read from the regions B and D of the memory 7.

The data #1 lower and the data #2 lower which are read by the AGU 11 are supplied to the display processing circuit 8 through the memory data bus 5. The display processing circuit 8 uses the data #1 lower and the data #2 lower in the second field period of time of the first display frame, to perform the interpolation processing. Thus, in the first display frame, the interpolation due to the frame interpolation system shown in FIG. 5 is performed so that the image data of the first display frame are created. These image data are for the fact that the image lower half the image plane is magnified twice in the vertical direction so that the image data are displayed on the whole area of the image plane.

Further, when the same data are read twice from the regions A to D by the flag which indicates that the coding data are the progressive image, the AGU 11 opens the read region.

In the latter half the second decoding frame, the data #1 lower and the data #2 lower are outputted from the MC circuit 4 in the block unit. The write control circuit 12 of the AGU 11 generates successively the write addresses which indicate the regions A and C, in the latter half the second decoding frame. Thus, write which is shown by the oblique lines K3 and K4 is performed.

Moreover, in the latter half the latter half (the first half the second display frame) this second decoding frame, the read addresses of the regions A and C are generated by the read control circuit 13 of the AGU 11. Thus, the data #1 lower and the data #2 lower which are written to the regions A and C are read at the timing shown in the oblique lines R5 and R6. Furthermore, the read control circuit 13 of the AGU 11 again generates the read addresses of the regions A and C in the latter half the latter half the second display frame, and again reads the data #1 lower and the data #2 lower which are written to the regions A and C, as shown in the oblique lines R7 and R8.

The display processing circuit 8 uses the data which are read at the timing of the oblique lines R5 and R6 to perform the interpolation of the first field, and uses the data which are read at the timing of the oblique lines R7 and R8 to perform the interpolation of the second field, to thereby obtain the image data of the second display frame.

Subsequently, similar operation is repeated so that a magnified image is obtained in which the lower half the image plane is magnified twice in the vertical direction, and is displayed.

In this manner, in the present embodiment, regarding the decoding data of the portion which is unnecessary for the image display, of the decoding data of the B picture, write with respect to the B picture region of the memory is not performed. For this reason, a room occurs in the memory capacity, and it is made possible to hold the portion necessary for the image display, in the 1 field period of time.

Accordingly, it is possible to supply the same data to the display processing circuit 8 in the first field and the second field. Thus, it is made possible that the frame interpolation system is employed in the display processing circuit 8. Thus, the image quality of the magnified image is improved.

In connection with the above, in the present embodiment, the B picture region of the memory is divided into the four regions. However, it will be clear that the dividing method of the B picture region, the write order and the read order of the data with respect to each of the regions, or the like is not specifically limited. Moreover, the example when the lower half the image is twice in the vertical direction and is magnified and displayed is described. However, the image portion which is used in display, the filtering process method thereof, or the like is not specifically limited.

Further, in the above-described embodiment, the example has been described in which, when the same data are read twice from the same region of the B picture, the AGU opens the region. However, it will be clear that the region may be opened after the same data have been read equal to or more than thrice, correspondingly to the time when the image of the picture is transformed in 3:2 pull-down, or the like.

In this invention, it is apparent that working modes or enforcement forms different in a wide range can be formed on the basis of this invention without departure from the spirit and scope of the invention. This invention is not restricted by any specific embodiment thereof except being limited by the appended claims.

What is claimed is:

1. An image decoding device comprising:
   input means for inputting coding data which includes original image data, bidirectional predictive coding image data, display information which identifies a special display, and information which identifies an image display format as one of interlace display and progressive display;
   decoding means connected to said input means for decoding inputted coding data in a predetermined block unit to output decoding data;
   memory means capable of storing said decoding data, said memory means having a reference image memory region and a display transformation memory region;
   write control means to which the display information is given for a special display in which a part of a restored image which is formed by said decoding data is used in display, for storing only said decoding data corresponding to the part of said restored image, to said memory means, on the basis of said display information, said write control means being operative in response to information which identifies a progressive display format to write decoding data associated with the bidirectional predictive coding image data to the display transformation memory region; and
   read control means for reading said decoding data corresponding to the part of said restored image which is written to said memory means, the reading taking place a number of times in accordance with the display information which identifies the special display, and for opening a memory region from which the reading a number of times has been complete to make that region available for writing.

2. An image decoding device according to claim 1, wherein said memory means has a capacity equal to or less than a capacity which stores said decoding data for one frame.

3. An image decoding device according to claim 2, wherein said memory means is divided into a plurality of memory regions, and wherein said decoding data which correspond respectively to regions of the image plane which is divided vertically are stored respectively to the memory regions of said plurality of memory regions.

4. An image decoding device according to claim 1, wherein said coding data are ones in which a progressive image is performed in coding, and wherein the decoding data which are stored by said memory means are ones in which bidirectional predictive coding data are performed in decoding.

5. An image decoding device according to claim 1, wherein said special display is a magnified display, and wherein said read control means performs twice reads before and after one field period of time for frame interpolation which enables said magnified display.

6. An image decoding device according to claim 1, wherein said special display is display due to 3:2 pull-down transformation, and wherein said read control means performs three reads to enable said 3:2 pull-down display.

7. An image decoding device comprising:

decoding means for performing in decoding inputted coding data in a predetermined block unit to output decoding data, the inputted decoding data including display information which identifies a special display, and information which identifies an image display format as one of interlace display and progressively display;

memory means having a plurality of memory regions capable of storing said decoding data which correspond to a region half an image plane having one field, in a vertical direction;

write control means to which the display information is given for special display in which a part of a restored image which is formed by said decoding data is used in display, for storing only said decoding data corresponding to the part of said restored image, on the basis of said display information, respectively to memory regions of the respective memory regions of said memory means, in which write is opened, with a decoding frame divided into a first field and a second field, said write control means being responsive to the identified image display format; and read control means for reading said decoding data corresponding to the part of said restored image which is written to said memory means, the reading taking place a number of times in accordance with said special display and for opening a memory region from which the reading a number of times has been completed to make that region available for writing.

* * * * *